Figure 1:
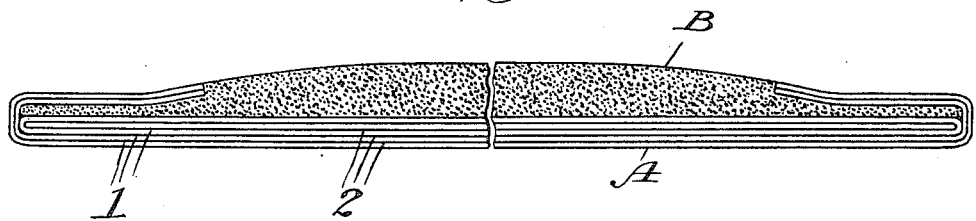

T. ROBINS.
CONVEYER BELT.
APPLICATION FILED NOV. 17, 1906.

981,312.

Patented Jan. 10, 1911.

UNITED STATES PATENT OFFICE.

THOMAS ROBINS, OF NEW YORK, N. Y.

CONVEYER-BELT.

981,312.  Specification of Letters Patent.  Patented Jan. 10, 1911.

Application filed November 17, 1906. Serial No. 343,933.

*To all whom it may concern:*

Be it known that I, THOMAS ROBINS, a citizen of the United States, residing in the city, county, and State of New York, have invented a new and useful Improvement in Conveyer-Belts, of which the following is a specification.

This invention relates to conveyer belts, and it has for its primary object the provision of a conveyer belt characterized by greater durability than conveyer belts hitherto produced which may be manufactured at substantially the same or less cost than conveyer belts as at present constructed.

Other objects of the invention will appear in the course of the following description, in which reference is had to the accompanying drawings, wherein I have illustrated several forms of belt embodying the present invention.

In the construction of conveyer belts the practice now almost invariably followed is to build up the body portion of the belt, which is designed to afford the required tensile strength, out of a number of plies of textile fabric, such as cotton duck, united by interposed layers of unvulcanized rubber stock rubbed into the fabric by calender rolls. These interposed layers of unvulcanized rubber stock, or "friction," are usually applied to the fabric in the plastic or solid state and do not penetrate the fabric so as to thoroughly coat all the fibers of which it is composed. On the contrary, only the superficial fibers of each ply of fabric come into contact with the rubber "friction" and it is comparatively easy to separate the alternate layers of rubber and fabric which enter into the body of the belt.

On the outer surfaces of the body of the conveyer belt formed in the manner above mentioned, a "cover" of some suitable rubber compound is applied, this "cover" being ordinarily considerably thicker on one surface of the belt than the other, as only one surface of the conveyer belt is ordinarily employed as a carrying surface. After the belt body has been built up and the cover of unvulcanized rubber stock applied thereto, the rubber in both the cover and the layers of "friction" in the body of the belt is vulcanized by subjecting the belt to a vulcanizing heat in a press by which the entire belt structure is subjected to any desired degree of pressure during the vulcanizing operation. The sulfur or other vulcanizing agent is of course incorporated with the rubber used in the construction of the belt before the belt is built up.

Belts constructed in the manner just described are commonly known as "rubber belts," and they manifest certain undesirable characteristics when subjected to heavy service. Owing to the character of the materials transported by conveyer belts and the conditions under which the belts are used, the cover of the belt is apt to become abraded or cut so as to expose the fabric employed in the body of the belt, and moisture is so allowed to come into contact with the fabric through these abrasions or cuts. As the fibers of the fabric in each ply of the belt are coated with rubber only at the surface, and as the rubber has not been found in practice to penetrate between the fibers of each thread even though originally applied in very plastic or cement-like condition, any moisture which reaches one of the plies of fabric in the belt body is absorbed by the fabric and disseminated through it by capillary action for a considerable distance from the abrasion or cut through which the moisture has penetrated to the fabric. The action of moisture upon the cotton fiber, which is almost invariably used in the construction of conveyer belts, causes rapid deterioration of the fiber and soon practically destroys the fabric of any ply of the belt affected for a considerable distance around the cut or abrasion through which water penetrates through the cover of the belt. As a result of this destruction of a portion of the layer of fabric immediately underlying the cover of the belt, a "blister" is formed in the belt in the locality affected and the portion of the cover overlying the "blister" is very apt to be torn loose, particularly when the belt is subjected to heavy service. As a further consequence of the action of water upon the fabric of a conveyer belt as at present constructed, several plies of fabric may be affected by water, because it not infrequently happens that the interposed layers of rubber "friction" are not impervious to water and the water may penetrate through several plies when there is a cut or abrasion of the belt cover. When this takes place, a section of the belt becomes practically worthless and must be cut out and replaced.

When the character of the material handled and the conditions under which the belt is operated are not such as to cause the deterioration above mentioned, the cover of the belt may gradually wear away without serious injury to the body of the belt, and in that event it is desirable to replace the worn cover by a new one; but it is practically impossible to replace the cover of an old conveyer belt of the present construction economically or effectively. The worn portion of the cover can not be readily detached and it is not ordinarily practicable to apply a new cover over the old and worn one and obtain such union of the new cover with the belt that it will adhere firmly throughout under the strains of ordinary service. Generally speaking, therefore, the life of a conveyer belt as at present constructed is no greater than the life of the cover, and when used with highly abrasive material and in the presence of much moisture, as when handling wet stone or ore, the body of the belt may become practically worthless before the cover is worn out.

The improved conveyer belt which forms the present invention is designed to eliminate the undesirable characteristics of conveyer belts of the usual construction which have been above pointed out. The improved conveyer belt consists of a body composed of a compound of gutta percha or equivalent substance, preferably with strengthening material embedded therein, and a cover of vulcanized rubber compound.

In the construction of the body I ordinarily employ a suitable number of plies of textile fabric thoroughly saturated with the compound of gutta percha or equivalent substance balata probably being the most desirable substance to use and the compound being applied in liquid condition to the duck so that it may penetrate between the fibers of a strand as well as between strands of the fabric. The number of plies of fabric employed in the body of the belt will vary, of course, with the size and strength of belt desired, but each ply is thoroughly saturated with a compound of gutta percha or equivalent material, such as balata, and ordinarily a compound containing both of these ingredients will be employed and the term gutta percha as hereinafter employed is intended not only to include the true gutta percha but balata, or a mixture of both or either with other materials which do not destroy the characteristic properties thereof.

In the construction of a conveyer belt according to the present invention, the plies of fabric for the body of the belt are coated with gutta percha in a semi-fluid condition, are then superposed and subjected to pressure sufficient to force the gutta percha compound entirely through the several plies of fabric and completely saturate them. The pressure is preferably a rolling pressure and the belt body produced may be described as a mass of gutta percha penetrating or impregnating the textile fabric embedded therein. This belt body is completely waterproof and if an incision is made thereinto and water introduced into it, the water will not extend through the plies of fabric adjacent to the incision, probably because each fiber of the fabric is completely coated with the gutta percha compound and the capillarity of the fabric has been wholly eliminated. On the belt body formed of fabric and gutta percha compound I apply a cover of vulcanized rubber compound which is secured to the belt body by a gutta percha cement and which may be held in place by additional fastening means, if desired. This cover may be applied to one or both surfaces of the belt and may be extended over the edges of the belt body if desired, but, owing to the thoroughly water-proof character of the body of the belt, the extension of the cover over the edges is not necessary, as in conveyer belts of the type now commonly employed.

In the accompanying drawings I have shown three types of belt embodying the present invention.

Figure 2:
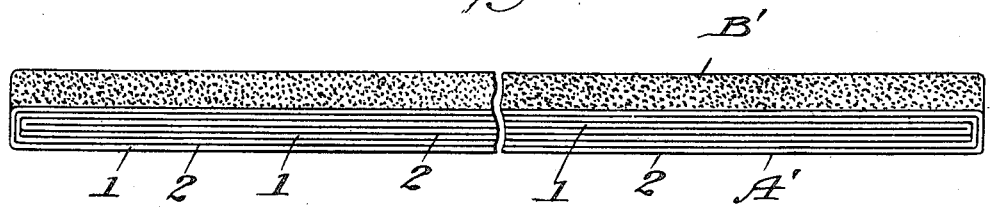
Figure 3:
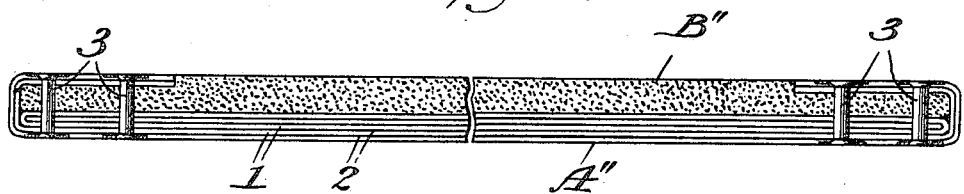

Figure 1 is a view in transverse section of a belt having the edges of the cover protected by plies of fabric from the belt body which overlie the edges of the cover. Fig. 2 is a transverse sectional view of a belt in which both the cover and the body are of uniform thickness throughout and the cover is simply cemented upon one surface of the belt body. Fig. 3 is a transverse sectional view of a belt in which the cover is protected at the margins by overlying plies of the fabric from the belt body and rivets are provided adjacent to the margins of the belt to assist in securing the cover to the body of the belt.

Referring now to the drawings by the reference characters, the numeral 1 is used to designate a ply of cotton duck or other textile fabric, and the numeral 2 designates the protective coating of gutta percha compound applied to each ply of duck and forming the layers of gutta percha interposed between the plies of fabric in the belt body. In the drawing the plies of fabric are shown in white and the interposed layers and coatings of gutta percha compound are indicated by black lines.

In Fig. 1 the body A of the belt is shown as made up of a plurality of plies of fabric and interposed layers of gutta percha compound, the two plies of fabric at the under surface of the belt body being carried around the marginal portions of the cover B of the belt so as to overlie it. The cover B is preferably thickest in its middle portion, where most of the wear is received, and thinnest at the marginal portions, which extend between the main portions of the belt body and the overlying plies of fabric. The cover is cemented directly upon the main portion of the belt body entirely across the under surface of the cover and the overlying portions of fabric are also cemented on the outer surface of the cover, a gutta percha cement being used throughout.

The belt shown in Fig. 2 is of the simplest possible construction, the belt body A' being composed of the same number of plies of fabric throughout its entire width and the cover B' being a single layer of rubber compound of uniform thickness throughout its entire width.

The belt illustrated in Fig. 3 is similar in some respects to that illustrated in Fig. 1. The belt body A" has the two plies of fabric at the under surface extended so as to pass around the edges of the cover B" upon the carrying surface of which they are secured both by cement and by rivets 3 passing entirely through the belt. Except near the margins, where the cover underlies the extended plies of fabric from the body of the belt, it is of uniform thickness throughout its entire width.

All three types of belt illustrated in the drawings have covers which are readily replaceable when injured. This replaceability of the melt cover results from the ease with which a gutta percha cement may be softened. While the rubber cover is held on the belt body at ordinary temperatures with greater tenacity by gutta percha cement than when vulcanized directly to the fabric, as in the ordinary type of conveyer belt, gutta percha cement may be so softened when heated to a moderate temperature that an old cover may be easily stripped off the belt body and a new cover applied. The replacement of the cover of the belt shown in Fig. 3 would, of course, be more difficult than the replacement of the cover in either of the other two types of belt, but the removal of the rivets shown in Fig. 3 is comparatively easy, and after the rivets have been removed the overlying plies of fabric can be quickly detached from the belt cover by first heating the belt to the required degree, and then the cover itself can be easily stripped off the belt body.

It will be understood that as gutta percha or balata for the body of the belt can be rendered as fluid as required by the usual volatile solvents, with or without heat, no difficulty is encountered in completely saturating the duck fabric and thereby producing a belt body that is substantially non-capillary. Furthermore, as the duck has not been subjected to vulcanizing temperature, injury to the cotton fiber by vulcanizing heat is obviated. When the vulcanized rubber cover has been cemented to the body of the belt, the finished belt will possess great toughness in wear, resistance to deterioration from moisture, and other desirable qualities.

As compared with rubber belts consisting of the same number of plies of fabric and having belt bodies of the same thickness, belts constructed according to the present invention are characterized by considerably greater tensile strength, because the interposed layers of gutta percha compound are somewhat thinner than the layers of rubber "friction" required in the ordinary belts and heavier weight fabric may be employed in producing a belt of given thickness and having a certain number of plies. Moreover, owing to the penetrating power of the gutta percha or balata as compared with that of rubber, I am able to use more closely woven and consequently stronger duck and I thus obtain a further increase of strength. Furthermore, as gutta percha has a much greater resistance to stretching strains than rubber compounds, a belt constructed according to the present invention shows less elongation under a given strain than a rubber belt of similar dimensions.

In the several forms of belt illustrated in the drawings, the cover of vlucanized rubber compound is shown as extending entirely across the carrying surface of the belt, as usual in conveyer belts. It is obvious, however, that it is not essential that the cover be extended over the entire carrying surface and, especially in belts upon which the wear is limited to the middle portion of the carrying surface, the portions of the cover adjacent to the margins of the belt may be dispensed with and the cost of the belt lessened without a substantial diminution of its strength and durability.

Having thus described my invention, what I claim as new and desire to secure by Letters Patent is:

1. A conveyer belt having a body composed of a plurality of plies of textile fabric and interposed layers of a gutta percha compound penetrating not only between the strands but between the fibers of the strands and rendering them non-capillary, and having a cover composed of a vulcanized rubber compound.

2. A conveyer belt having a body composed of a plurality of plies of textile material and a gutta percha compound forming interposed layers between said plies and thoroughly saturating said plies, and having a cover composed of a vulcanized rubber compound.

3. A conveyer belt having a body portion composed of a plurality of plies of textile fabric united and saturated by a gutta percha compound and having a cover composed of a vulcanized rubber compound and secured to said body by means of gutta percha cement.

4. A conveyer belt comprising a body portion and a cover of rubber compound or other resilient material, said body portion being composed of a plurality of plies of textile fabric united by a water-proof adhesive compound, certain of the plies in the body of the belt being extended to overlie the edge portions of the cover.

In testimony whereof, I have signed my name in the presence of two witnesses.

THOMAS ROBINS.

Witnesses:
   ROSCOE L. PETERSON,
   BAXTER MORTON.